(12) United States Patent
Sundaram et al.

(10) Patent No.: US 8,887,303 B2
(45) Date of Patent: Nov. 11, 2014

(54) METHOD AND SYSTEM OF PROCESSING ANNOTATED MULTIMEDIA DOCUMENTS USING GRANULAR AND HIERARCHICAL PERMISSIONS

(75) Inventors: Shiva Kumar Sundaram, Berlin (DE); Rudi Haas, Hargesheim (DE); Pablo Vidales, Las Americas Naucalpan Edo (MX)

(73) Assignee: Deutsche Telekom AG, Bonn (DE)

( * ) Notice: Subject to any disclaimer, the term of this patent is extended or adjusted under 35 U.S.C. 154(b) by 377 days.

(21) Appl. No.: 12/985,375

(22) Filed: Jan. 6, 2011

(65) Prior Publication Data
US 2011/0173705 A1 Jul. 14, 2011

(30) Foreign Application Priority Data
Jan. 8, 2010 (EP) .................................. 10150316

(51) Int. Cl.
*G06F 21/24* (2006.01)
*G10L 17/26* (2013.01)
*G06F 21/62* (2013.01)
*G10L 17/00* (2013.01)

(52) U.S. Cl.
CPC ............ *G06F 21/6227* (2013.01); *G10L 17/26* (2013.01); *G10L 17/005* (2013.01)
USPC ................... 726/28; 726/26; 726/27; 726/29; 726/30; 709/204; 709/205

(58) Field of Classification Search
CPC ... G06F 21/10; G06F 21/6227; G06F 17/211; G06F 17/24; H04L 12/1831; H04L 2463/101; H04L 65/4015; H04L 65/602; H04L 65/607; H04N 19/00012; H04N 19/00903; H04N 21/47205; G10L 17/26; G10L 17/005
USPC .............................. 726/26–30; 709/204–205
See application file for complete search history.

(56) References Cited

U.S. PATENT DOCUMENTS

| | | | |
|---|---|---|---|
| 5,797,123 A | 8/1998 | Chou et al. | |
| 6,262,777 B1 * | 7/2001 | Brewer et al. | 348/515 |
| 6,738,743 B2 | 5/2004 | Sharma et al. | |
| 7,676,544 B2 * | 3/2010 | Murakami et al. | 709/204 |
| 7,870,193 B2 * | 1/2011 | Hintermeister et al. | 709/204 |
| 7,912,952 B2 * | 3/2011 | Mizutani et al. | 709/225 |
| 7,933,952 B2 * | 4/2011 | Parker et al. | 709/204 |
| 8,151,365 B2 * | 4/2012 | Chen et al. | 726/30 |

(Continued)

FOREIGN PATENT DOCUMENTS

WO WO2008057444 * 5/2008 ............... H04N 7/10

OTHER PUBLICATIONS

Ajmera et al. "Age and Gender Recognition using Modulation Cestrum" in ISCA 2008 Odyssey Workshop.

(Continued)

*Primary Examiner* — Catherine Thiaw
(74) *Attorney, Agent, or Firm* — Leydig, Voit & Mayer, Ltd.

(57) ABSTRACT

The invention relates to a method and apparatus of processing at least one multimedia document, comprising the steps of determining at least one segment of the document, and assigning at least one type of permission to said at least one segment, wherein the type of permission assigned to a segment of the document is available for later use when processing the document.

10 Claims, 5 Drawing Sheets

(56) References Cited

U.S. PATENT DOCUMENTS

| | | | |
|---|---|---|---|
| 8,166,305 B2* | 4/2012 | Martinez | 713/176 |
| 2004/0107249 A1* | 6/2004 | Moser et al. | 709/204 |
| 2005/0119976 A1* | 6/2005 | Taylor et al. | 705/52 |
| 2005/0125358 A1* | 6/2005 | Levin et al. | 705/59 |
| 2005/0131714 A1* | 6/2005 | Braunstein et al. | 705/1 |
| 2006/0100877 A1 | 5/2006 | Zhang et al. | |
| 2006/0116966 A1* | 6/2006 | Pedersen et al. | 705/59 |
| 2006/0190537 A1* | 8/2006 | Morris | 709/204 |
| 2007/0033154 A1* | 2/2007 | Trainum et al. | 707/1 |
| 2007/0067427 A1* | 3/2007 | Bugir et al. | 709/223 |
| 2008/0005243 A1* | 1/2008 | Cohen et al. | 709/204 |
| 2008/0112006 A1* | 5/2008 | Sambe et al. | 358/1.15 |
| 2009/0100013 A1* | 4/2009 | Fein et al. | 707/3 |
| 2009/0113378 A1* | 4/2009 | Boyer et al. | 717/101 |
| 2009/0210491 A1* | 8/2009 | Thakkar et al. | 709/204 |
| 2009/0222518 A1* | 9/2009 | Chang et al. | 709/204 |
| 2009/0228279 A1 | 9/2009 | Kephart et al. | |
| 2009/0234921 A1* | 9/2009 | Dudley | 709/205 |
| 2009/0300475 A1* | 12/2009 | Fink et al. | 715/230 |
| 2009/0313703 A1* | 12/2009 | Mao | 726/27 |
| 2010/0111417 A1* | 5/2010 | Ward et al. | 382/173 |
| 2010/0274820 A1* | 10/2010 | O'Brien et al. | 707/805 |
| 2011/0016387 A1* | 1/2011 | Mundy et al. | 715/255 |
| 2011/0072159 A1* | 3/2011 | Kim et al. | 709/246 |
| 2011/0137988 A1* | 6/2011 | Balogh et al. | 709/204 |
| 2011/0154204 A1* | 6/2011 | Narayanaswamy | 715/727 |
| 2013/0104241 A1* | 4/2013 | Blom et al. | 726/26 |
| 2013/0185163 A1* | 7/2013 | Krikorian et al. | 705/14.69 |

OTHER PUBLICATIONS

Bahl et al. "A Maximum Likelihood Approach to Continuous speech Recognition" in Readings in Speech Recognition 1990.

Glass, "Challenges for Spoken Dialogue Systems" in proceedings of the IEEE Automatic Speech Recognition and Understanding Workshop (ASRU) 1999.

Lee et al "Towards Detecting Emotions in Spoken Dialogs" IEEE Transactions on Speech and Audio Processind vol. 13, No. 2, Mar. 2005.

Reynolds et al. "Robust text-independent Speaker Identification Using Gaussian Mixture Models" IEEE Transactions on Speech and Audio Processing vol. 3, No. 1, Jan. 1995.

Weintraub "LVCSR Log Likelihood Ratio Scoring for Keyword Spotting" in International Conference on Acoustics Screech and Signal Processing, 1995.

* cited by examiner

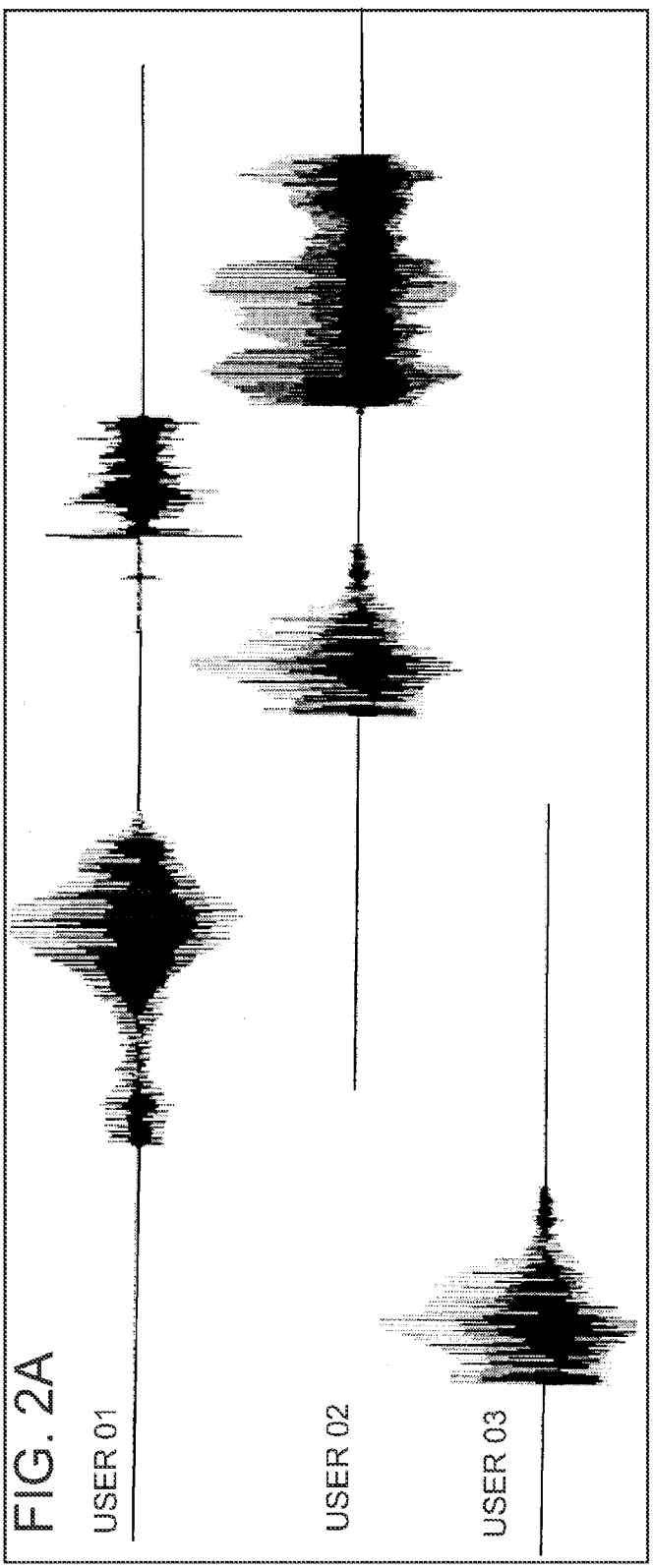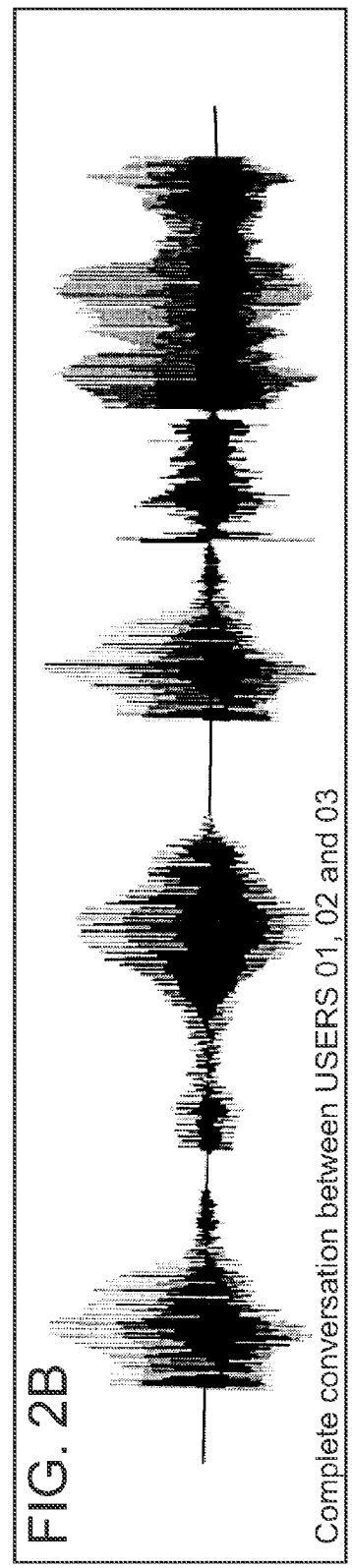

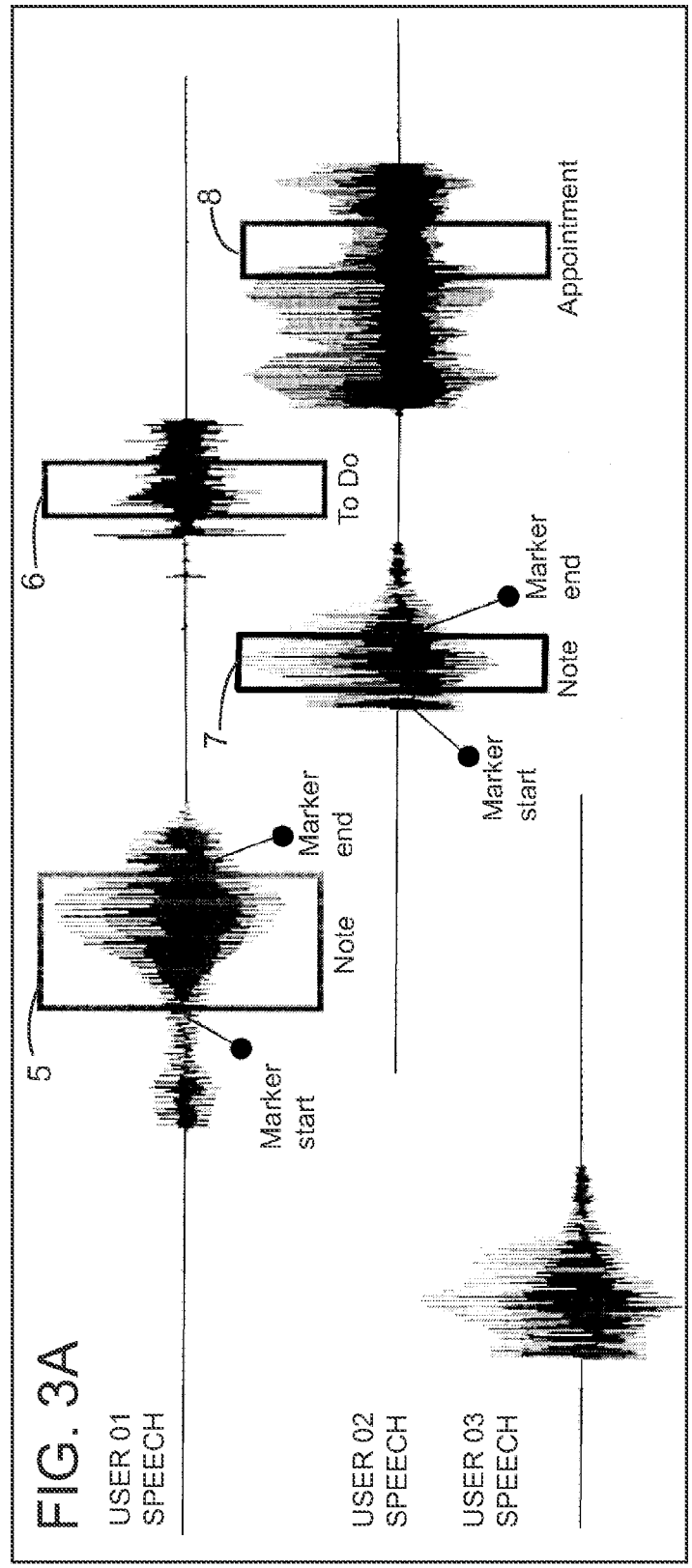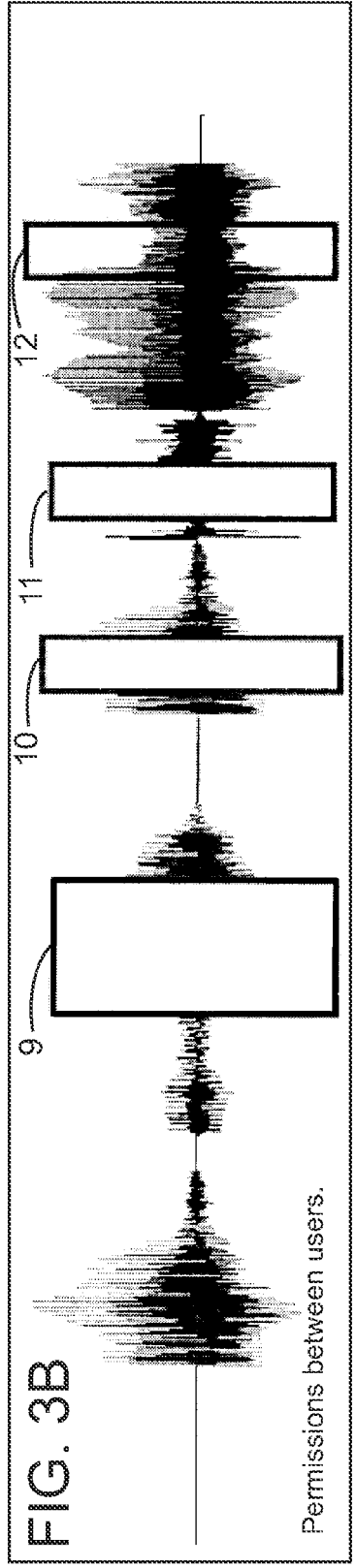

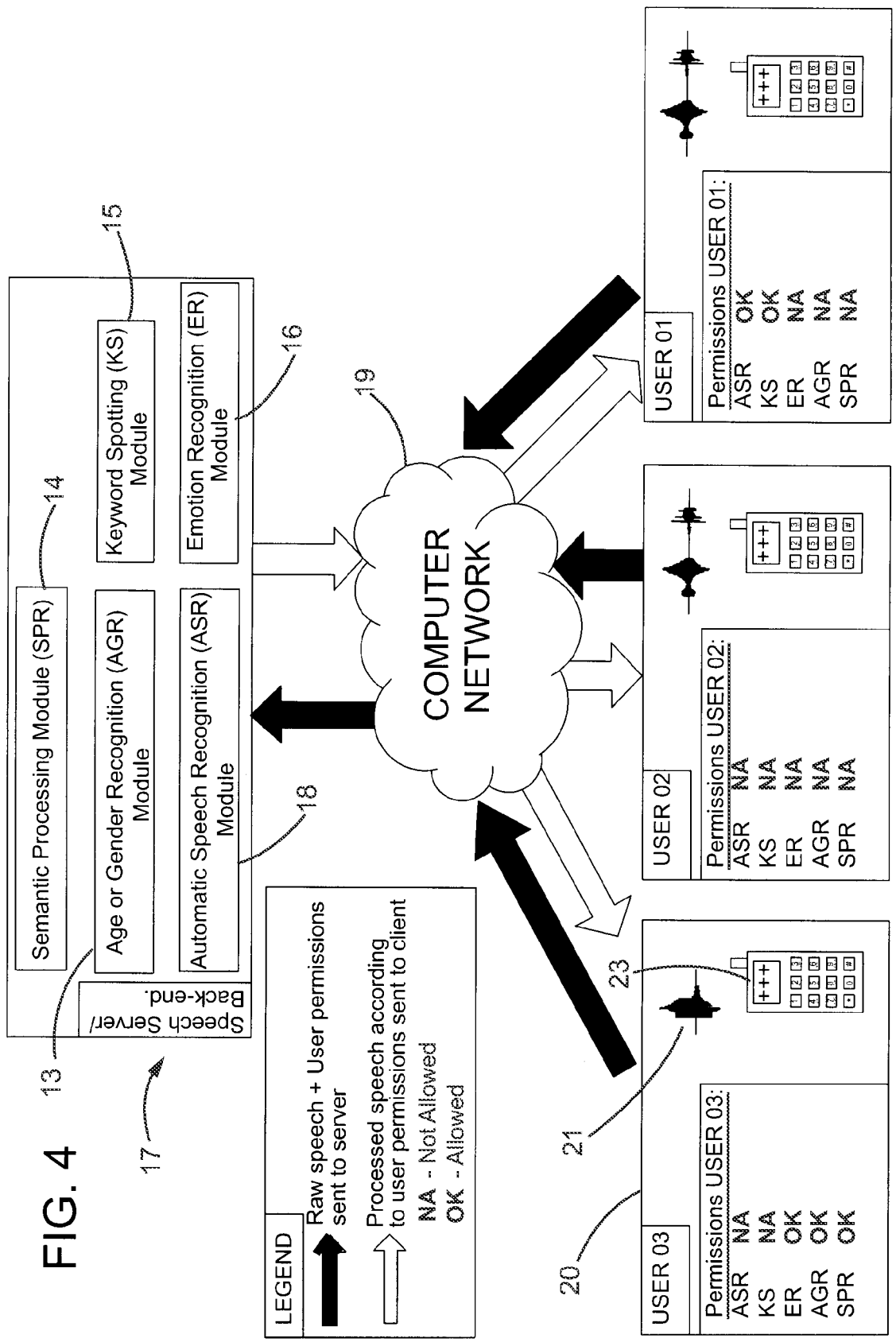

METHOD AND SYSTEM OF PROCESSING ANNOTATED MULTIMEDIA DOCUMENTS USING GRANULAR AND HIERARCHICAL PERMISSIONS

Priority is claimed to European Patent Convention Application No. EP 10 15 0316.7, filed Jan. 8, 2010, the entire disclosure of which is incorporated by reference herein.

The invention relates to a method and system of processing annotated multimedia documents using granular permissions. The invention specifically relates to a method and system of capturing, processing and sharing annotated multimedia documents using granular permissions. The multimedia documents can be audio recordings, telephonic conversations, or video streams, or text documents such as email, SMS, chats logs, etc. The annotation of such a document can include marking specific regions of interest for a user. These annotations can also include permissions of participating users. The users are able to access the specific regions of interest according to the allotted permission. The invention can be used in the field of telecommunications. It presents a method to share multimedia documents in the form of electronic documents over a computer network such as the Internet.

Today, the Internet enables users to participate in creation of sharing electronic documents. These include creating editable text documents, spreadsheets, sharing calendars, notes, chats, pictures etc. A variety of commercial applications such as Google Docs, Flickr, and also popular social networking sites such as FaceBook already exist. In these applications it is possible to share both work related and personal data.

A variety of handheld devices such as PDAs, Smartphone along with existing data exchange networks (cellular networks, Wi-Fi etc) enable users to create, access, share and edit/access documents anytime and virtually anywhere.

It is also commonplace for users to share multimedia documents instantly using data networks and Internet-based applications. Multimedia documents include pictures/images. In addition to sharing multimedia documents, the applications also enable users to add caption, tag specific parts of a document (such as people's faces on images).

For example in Flickr, in addition to adding a caption a blog and keywords to images, users are able to mark specific parts of an image and include additional comments on the image. In general, these tags remain hidden, but when a user moves the pointing device over the specific region, the tag and the boundary of the region pops up.

This aspect is also popular in text documents such as Adobe-PDF files where sticky notes and highlighting of specific words or sentences of text are possible. Another example where users can collectively create/edit and manage documents is Google Docs.

In the examples illustrated above, in addition to marking and tagging, it is also possible to assign permissions to whole documents. Permission is a mechanism that allows one user (usually the author) to selectively allow other users to either access the document view/browse the whole document or make the document editable/annotatable or completely disallow access to the document.

Sharing documents is also applicable to audio documents. Audio documents include podcasts, music files, or recorded speech/conversation. In audio documents too it is possible to add captions and tags or other annotations and also have permission based access mechanisms.

Marking specific regions in pictures/images translates to marking specific (short) contiguous segments of the audio documents. This requires start time and the end time. The marked segments can also be tagged/annotated using text. Such a document can again be shared in the conventional approach where the tags are editable or accessible to only a selected group of users.

US2006100877 proposes a system and a method for generating speech minutes. The method maps speech chunks to text information via a user interface such as the audio chunk and related text formed voice tagged meeting minutes.

In US 2009228279 a method and system for recording of an audio performance of media in segments over a communication network is described. It records a media file in segments that can be tagged with text notes. The segments of audio data may be collected and arranged in order and assembled with prerecorded segment cues.

U.S. Pat. No. 6,738,743 B2 relates to a method for architecture configuration. Selection can be made between a client-based configuration, a server-based configuration or a client-gateway-server distributed configuration based upon user functionality and network conditions.

U.S. Pat. No. 5,797,123 describes a method to perform flexible speech processing for detecting key-phrases.

The object of the present invention is to provide a method and a system of processing multimedia documents, wherein an author or a collection of users can selectively determine the permission to use said multimedia document by another user.

This object is achieved with the features of the claims.

The invention describes a method and an apparatus of processing at least one multimedia document, wherein at least one segment of the multimedia document is determined, one type of permission is assigned to this segment such that the later use of the multimedia document can be controlled using the assigned permission. More specifically, the permission assigned to a segment of the document may allow a user to capture this segment, to share this segment, to modify this segment or to further process this segment of the multimedia document.

According to a further aspect of the present invention, two or more segments of the multimedia document can be defined, wherein different segments can be related to a different type of permission. This allows that a user, for example an author may control the later use of the multimedia document by specifying which segment can be used by a first user or a first group of users and which segment can be used by a second user or second group of users. Preferably, any different types of permission can be related to a plurality of users or group of users.

According to another aspect of the invention, said defined segment of a multimedia document can be marked. A tag and/or an annotation can be provided to the marked segment. Similar to the segment as such, a type of permission can be assigned to said tag and/or annotation. This allows that a user, for example an author can control the later use of a multimedia document by specifically assigning the respective permission of a user with regard to the tag and/or annotation of a respective segment.

According to a preferred embodiment of the invention, the method comprises the steps of assigning a binary permission to the whole document such that a user, for example an author can determine whether a user will have access to the whole document or not, for example to capture, to process or to share the whole document. Binary permissions can be also assigned to at least one segment of the multimedia document, such that the author can determine whether a user can capture, process or share this segment or not. In a corresponding manner, a binary permission can be assigned to one tag and/or annotation. This embodiment allows a user, for example an author to provide a hierarchical permission such that the author can determine the access to the multimedia document, e.g., reading the document or not, and in the affirmative, the author can specify what a user can do with the multimedia document. For example, the specific type of permission may comprise the ability to copy and paste a particular segment of the multimedia document or to change the form and style of the segment of the multimedia document or to edit the segment of the multimedia document. Other types of uses may be permitted depending on the respective type of permission which is assigned by the author to the corresponding segment. For example, this comprises the re-use of a segment, the replaying of a segment or the sharing of a segment.

For example, when processing an audio document, an author may assign a hierarchical permission scheme to this audio document. The respective author or the owner of the multimedia document can assign binary permission to allow processing of the audio document. Additionally, the author or the owner may also assign binary permission to a selected segment of the audio document. Subsequently, if the processing for the whole audio document is allowed and processing of a selected segment is also allowed, then the type of processing that is allowed to be performed on the document can also be defined by the author. In one embodiment, the author may selectively allow emotion recognition, age and/or gender recognition, speaker recognition, semantic processing/understanding and keyword spotting.

In the case that the multimedia document is an image or video clip, an author can assign the following hierarchical permission scheme. The respective author or the owner of the multimedia document can assign permission to allow a processing of the whole image or video clip or not. Additionally, the user or the owner may also assign binary permission to a selected segment of the image or video clip. Subsequently, if the processing for the whole image or video clip is allowed, and processing of a selected segment is also allowed, then the type of processing that is allowed to be performed on the document can also be defined by the user. In an embodiment, the author may allow face detection to select areas or segments of the image or video clips. On the other hand, the author may not allow subsequent detailed processing such as face recognition after the face detection procedure.

According to a further aspect of the invention, two or several multimedia documents may be generated or recorded by two or several respective authors. These two or more multimedia documents can be combined to a new combined multimedia document. At least one of these generated or recorded multimedia documents can be processed according to the above discussed aspects of the invention. For example, a first author may determine at least one segment of a first multimedia document and assign at least one type of permission to said at least one segment and/or the second author determines at least one segment of the second multimedia document and assigns at least one type of permission to said at least one segment. The new combined multimedia document comprises the respective permissions given by one or more authors to corresponding segments of the respective multimedia documents. Thus, the corresponding information regarding the type of processing is automatically transferred to the new combined multimedia document.

When, e.g., combining two multimedia documents resulting from a telephone conversation between two parties, the two audio files (individually comprising of each party's speech) are combined into one multimedia document comprising the whole conversation between the two parties. The combination is done by using, e.g., time synchronization. Each audio document recorded at the place of an author will receive a time information so that synchronization can be done on a time basis.

Such type of conversations can be captured over the phone but also through other systems, e.g., a video system or a phone conference system or other Internet-based systems using networks and/or wireless communication systems.

In this invention a system that assigns granular and hierarchical permission to audio streams (and multimedia document) has been implemented. The granularity aspect arises from the fact that certain segments or sections of the document can be marked and made exclusive by the author or the owner of the document. In this, selected sections, regions or segments can have different permission settings and accordingly different users can only access the available document in such a manner. For example, when sharing a recording of a two-party phone conversation one party can selectively limit the access to certain segments of the conversation to the other party. Such a system can be used in sharing a conversation between friends in an Internet-based social network, but does not allow other users to access the conversation.

In this invention an audio stream or multimedia document can be a recording of a two-party or multi-party conversation that has been captured over the phone. In this, the recording of each party can be recorded individually (and locally) and finally combined together to form the whole conversation. Such a scenario can arise when the users are having a conversation using mobile phones, and an in-call voice recording application of the phone user has been enabled in each handset. This invention also describes a method for sharing the recorded audio stream or multimedia document, as well as a method for granular tagging whereas tags have associated permissions for further processing of the tagged audio snippet.

The method described in US2006100877 deviates from the present invention at least in the following aspects:
  Voice chunks are generated using a voice recording device during a meeting. The present invention records one end of a conference call to generated voice chunks.
  US2006100877 correlates (tags) voice chunks to text. The present invention tags chunks with additional data for future sharing of the calls.
  The present invention enables granular tagging of voice calls by associating data to voice chunks, for this it proposes a novel method for granular tagging of voice calls. US2006100877 proposes a method exclusively for correlating voice chunks to text minutes.
  The present invention proposes a voice recording method based on using a recording module to generate one-party speech file for each of the parties in a call, and post-call speech mixing of the generated files. On the contrary, in US2006100877 voice chunks are generated from direct speech recording and then tagged to text minutes.

The method and system of US2009228279 defers from the present invention in at least the aforementioned aspects. Also, in US 2009228279 there is not a method to support granular control (i.e. permissions) of voice segments. On the contrary the present invention proposes a method for granular permission that in a sample application can be used for selective data sharing contained in voice segments.

The present invention focuses on different-types of information (emotion, spoken keywords or age/gender information) that can be extracted from the raw speech based on the permission explicitly set by the user. As illustrated in FIG. 3, if say USER 03 allows only keyword spotting and speech-to-text, then the back-end server or speech processing module only extracts and processes that type of information. Additionally, USER 03 can also specify what type of keywords can be detected from the raw text stream. For instance, she or he may allow detection of spoken digits (such as phone number or dates) but may not allow detection of personal names.

BRIEF DESCRIPTION OF THE DRAWINGS

FIG. 2 shows an example of a method for audio stream or document recording based on individual recording of multi-party conversations.

FIG. 3 shows an example of a method for mixing recorded video calls for granular tagging and sharing.

FIG. 4 shows an example of a method of a particular embodiment for granular tagging and assignment of permissions.

DETAILED DESCRIPTION OF INVENTION

In this invention an audio stream or document can be a recording of a two-party or multi-party conversation that has been captured over a phone or a computer-based client. In this, the recording of each party can be recorded individually (and locally) and finally combined together to form the whole conversation. Such a scenario can arise when the users are having a conversation using mobile phones, and an in-call voice recording application of the phone user has been enabled in each handset.

Figure 1:
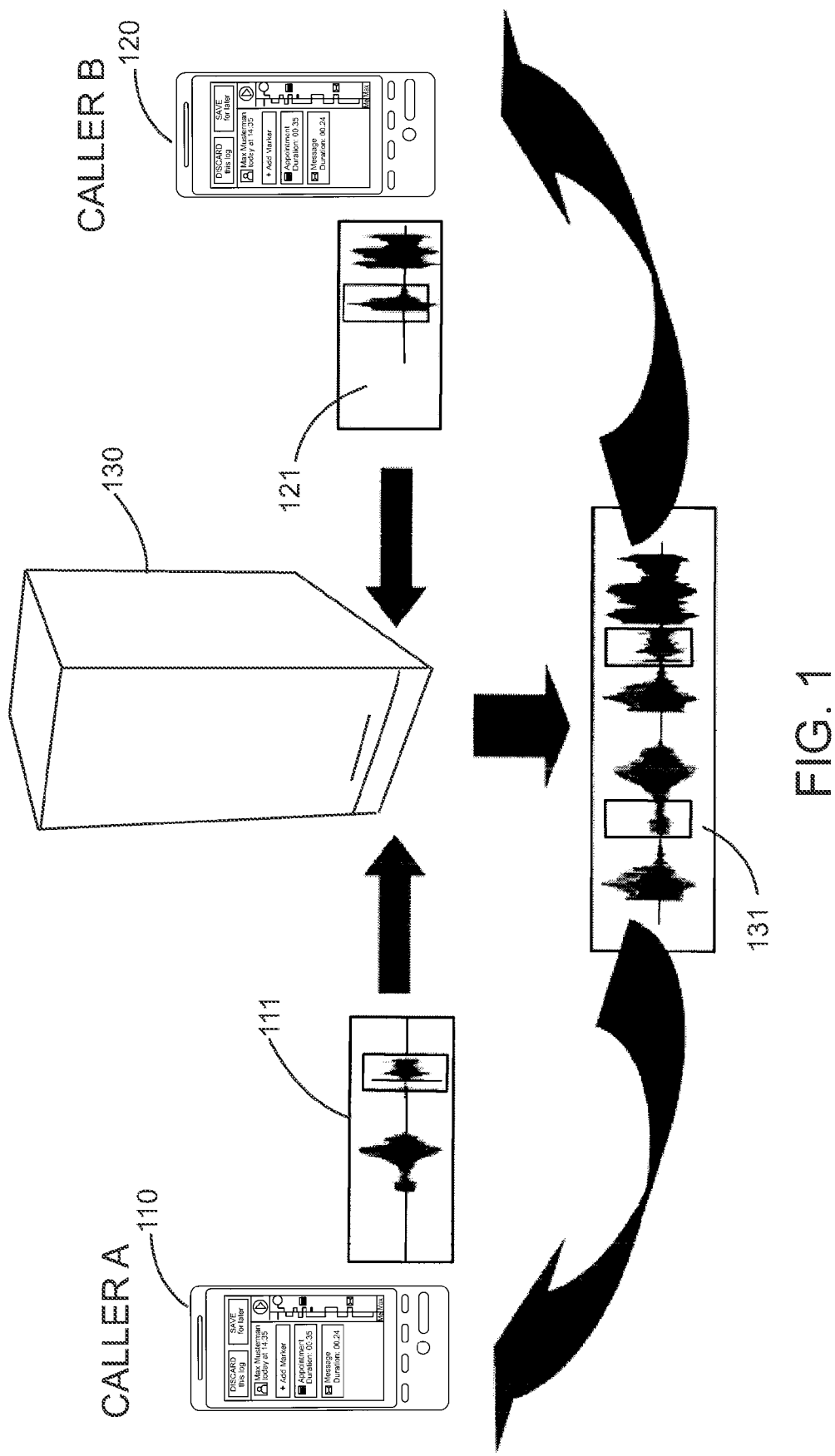
FIG. 1 shows a block diagram of an embodiment of the present invention for describing a method and system of capturing, processing and sharing annotated multimedia documents using granular permissions.

FIG. 1 illustrates such a setting. In general, caller A 110 establishes a call with caller B 120, in the depict scenario both caller A and caller B carry devices capable of recording audio streams or multimedia documents. Callers A and B can also be named authors A and B. Caller A records his local audio stream or multimedia document and generates a file 111, and caller B also records his own local document and generates a file 121. Both individual recordings 111 and 121 are sent to a central server 130 whereas these recordings may contain associated tags (FIG. 2). The individual recorded audio streams or multimedia documents are received in the server and combined to generate a file that contains both, caller A and caller B local recordings 131 that may be sent to caller A or B, containing combined recording and associated tags and permissions. This invention supports two or more participants. This is depicted in FIG. 2.

In FIG. 2 (*a*), the recordings from three users ('USER 01', 'USER 02', and 'USER 03') are recorded individually in their respective handsets or application. The three users can also be named authors. The application then combines the speech from each user and combines them to form the complete conversation. This is illustrated in FIG. 2 (*b*). The combination can result in a single waveform (1-channel) or maintained as separate waveforms itself (multi channel). The resulting audio clip after combining them may or may not be shared amongst the parties in the telephonic conversation. In such a set up each user may or may not be allowed to access the other party's speech. In addition to obtaining combined conversation, this system also enables in-call marking/tagging and post-call marking tagging of selected segments of the audio stream. The recorded audio stream can be selectively replayed or reused by a user. These segments can also be annotated with permissions where the respective user may or may not choose to share a certain segment of the audio stream.

FIG. 3 illustrates multi-party tagging and combination. In this illustration (FIG. 3*a*) a typical voice-based note-taking task has been illustrated where USER 03 has marked 5 and 6 from USER 01 and 7 and 8 from USER 02. Each marking is defined by their individual start time point and end time point within the conversation. In this illustration, USER 01 has not allowed USER 03 to reuse or share 5 and 6, while USER 02 has only allowed 8 to be shared with USER 03. In the final combined waveform (FIG. 3*b*), USER 03 is only able to access and play 12 as that is the only segment allowed by USER 02, whereas USER 03 does not have access to those parts which are indicated with 9, 10 and 11.

In addition to selective conversation sharing, this system can also selectively allow for automatic processing methods. Automatic processing methods can include, speech to text conversion such as discussed in L. Bahl, F. Jelinek and R. Mercer "A Maximum Likelihood Approach to Continuous speech Recognition" in *Readings in Speech Recognition* 1990, speaker identification described in D. A. Reynolds and R. C. Rose "Robust text-independent Speaker Identification Using Gaussian Mixture Models" IEEE Transactions on Speech and Audio Processing Vol. 3, No. 1, January 1995., emotion detection/recognition described in C. M. Lee and S. Narayanan "Towards Detecting Emotions in Spoken Dialogs" IEEE Transactions on Speech and Audio Processing Vol. 13, No. 2, March 2005., or semantic processing by dialogue understanding such as described in J. Glass "Challenges for Spoken Dialogue Systems" in proceedings of the IEEE Automatic Speech Recognition and Understanding Workshop (ASRU) 1999.

The permissions can be hierarchical. In one way, a user may or may not choose to share the raw audio stream or may choose to share only the annotations or tags of the audio stream or may choose to share only selected types of annotations where no personal information is present. For example in a note-taking task discussed previously, a user may choose to share 'Calendar' tags but may not choose to share 'Notes' or 'To Do' tags.

In another way, the user may choose to explicitly state the type of automatic processing from the raw audio stream. For example, the user may allow for speech-to-text processing but will not allow recognition of emotional state from the raw audio stream or vice versa. In another case, a user may allow automatic keyword spotting of common terms such as 'meeting' or 'calendar' or 'movie' such as using a keyword spotting system described in M. Weintraub "LVCSR Log Likelihood Ratio Scoring for Keyword Spotting" in International Conference on Acoustics Speech and Signal Processing, 1995 but disallows speech to text processing of personal information such as proper names or telephone numbers. In yet another case, the user may not allow for being identified by automatic speaker recognition methods, but will allow speech-to-text conversion (anonymity). In a different case, the user may allow speech-to-text conversion or recognition of emotional state from the raw audio clip, but may disallow recognition of age or gender using a module such as described in J. Ajmera and F. Burkhardt "Age and Gender Recognition using Modulation Cestrum" in ISCA 2008 Odyssey Workshop. These aspects are also extended to multi-party cases where depending on the assigned relationship between the users or the permissions explicitly set by the users, one can allow or disallow certain types of processing of audio.

Such an embodiment is illustrated in FIG. 4, where multi-party speech between USER 01, USER 02 and USER 03 is sent from a user client 20 that can be a mobile phone 23 or a desktop software application to a central speech server using a computer-based network 19. In addition to the raw speech 21, the client also sends, using the computer network 19, preferred permission settings as defined by the user. In the illustration, permissions 22 set by USER 03 says that the speech processing block 17 is allowed to perform Emotion Recognition 16 (ER=OK), Age/Gender Recognition 13 (AGR=OK) and Semantic processing/understanding 14 (SPR=OK), but the processing block is not allowed to perform Automatic Speech Recognition 18 (ASR=NA) and keyword spotting 15 (KS=NA). Permissions for other types of speech processing can also be set or defined in the system. Similarly, USER 01 and USER 02 assign respective permissions to specified segments of the raw speech.

Figure 5:
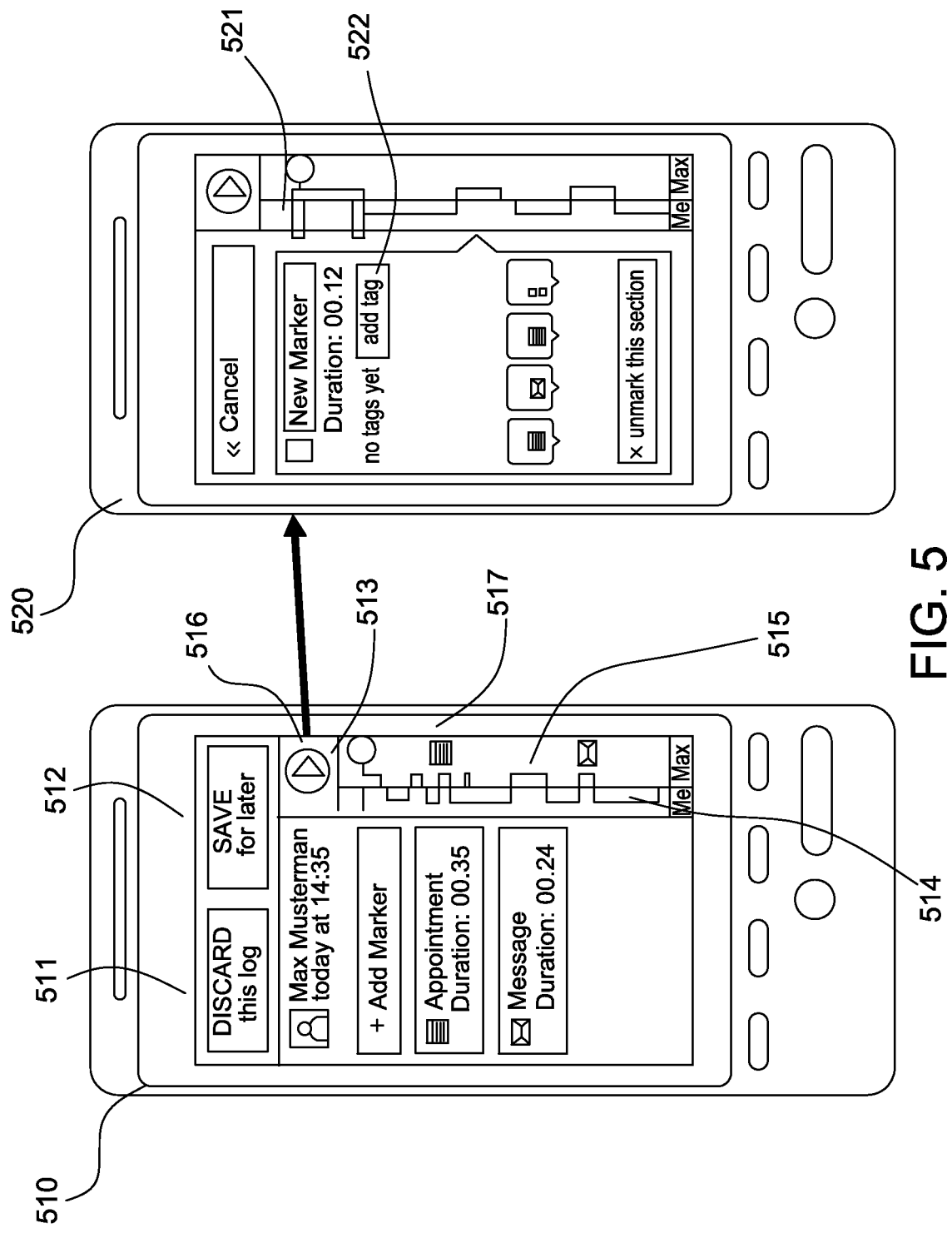
FIG. 5 shows an example of a graphical user interface of a particular embodiment of the system.

FIG. 5 shows details on the graphical user interface of a particular embodiment of the present invention. For this particular implementation, the interfaces shown are implemented in order to provide a control tool to the users. This embodiment runs on a mobile phone whereas the invention may run on other computing devices such as laptops, MDA or similar.

The screen 510 shown in the left side of the figure is built on the method of granular tagging. In this particular embodiment, one or both parties have agreed on recording their own side of the audio stream or multimedia document as depicted in FIG. 1 and the recording has been generated. After finishing the recording process, the user would like to tag the generated file to add particular information to the recording. In 510, after a document has been recorded the caller may discard the recorded log 511 or save it for further processing 512. In the screen 510 on its right side, there is also a graphical representation of the resulting log after combining the individual recorded calls from all involved parties 513. In this embodiment, the left side of the bar is the local recording 514 and the right side of the bar is the other party recording 515 in a two-party call. This combined log is generated in the server as illustrated in FIG. 1 and FIG. 2 and may be shared to at least the parties involved in the respective audio stream or multimedia document.

Also in the same screen 510 and in this particular embodiment there is a button that activates the screen 520 on the right side of FIG. 5 whereas the last one is used for tagging the generated log 516. For the particular embodiment, tags associated to the log are represented according to the particular applications that interface with the present system whereas this may be a calendar appointment, an email, a note, a reminder, an online application, etc. For example, the tag represented by the icon 517 represents a calendar appointment, one or more tags can be associated to the log and each tag may have different policies associated whereas these policies can be related to access control, processing restriction, privacy, etc.

A tag can be associated to a log using the screen 520 in the right side of FIG. 5. The snippet is limited (start and end) by placing markers 521, and the user can mark or unmark sections of the audio stream or multimedia document. After marking a particular section, a tag can be associated to the section of the recording 522.

The present invention has now been described with reference to several embodiments thereof. The foregoing detailed description and examples have been given for clarity of understanding only. No unnecessary limitations are to be understood there from. It will be apparent to those skilled in the art that many changes can be made in the embodiments described without departing from scope of the present invention. In particular, although features and elements of the present invention are described in the preferred embodiments in particular combinations, each feature or element can be used alone without the other features and elements of the preferred embodiments or in various combinations with or without other features and elements of the invention. Therefore, the scope of the present invention should not be limited to the apparatuses, methods and systems described herein.

The invention claimed is:

1. A method of processing multimedia documents corresponding to parts of a conversation between two or more users, comprising the steps of:
   individually and locally generating or recording two or more multimedia documents by the two or more users, a first multimedia document of the two or more multimedia documents corresponding to a first part of the conversation corresponding to a first user, and a second multimedia document of the two or more multimedia documents corresponding to a second part of the conversation corresponding to a second user;
   combining, by a processor, the two or more multimedia documents to a new combined multimedia document;
   defining at least two segments of the new combined multimedia document;
   assigning, based on input from the first user, a first type of permission to a first segment of the new combined multimedia document, wherein the first segment of the new combined multimedia document is based on content from the first part of the conversation corresponding to the first user; and
   assigning, based on input from the second user, a second type of permission to a second segment of the new combined multimedia document, wherein the second segment of the new combined multimedia document is based on content from the second part of the conversation corresponding to the second user;
   wherein the two or more multimedia documents each comprise time information and the step of combining the two or more multimedia documents is based on time;
   determining whether to assign a first binary permission to allow processing of at least one segment of the new combined multimedia document; and
   determining whether to assign a second binary permission to allow processing of at least one of a tag and an annotation; then
   assigning a plurality of types of permissions to at least one of the segment and the at least one of a tag and an annotation.

2. The method according to claim 1, further comprising the steps of:
   marking at least one segment of the new combined multimedia document;
   providing at least one of a tag and an annotation to the at least one marked segment; and
   assigning at least one type of permission to the at least one of the tag and the annotation provided to the at least one marked segment.

3. The method according to claim 1, wherein the plurality of types of permission comprise at least one of:
   allowing a user to access a respective one of the segments;
   allowing a user to access a respective one of the at least one of a tag and an annotation;
   allowing a user to re-use the respective segment;
   allowing a user to replay the respective segment; and
   allowing a user lo share the respective segment.

4. The method according to claim 1, wherein the new combined multimedia document is an audio document and the plurality of types of permission comprise at least one of:
- performing emotion recognition;
- performing at least one of an age and a gender recognition;
- performing a speaker recognition;
- performing a semantic processing; and
- performing a keyword spotting.

5. The method according to claim 1, wherein the new combined multimedia document is at least one of an image and a video document and the plurality of types of permission comprise at least one of:
- performing a face detection;
- performing a face recognition;
- performing an emotion recognition;
- performing at least one of an age and a gender recognition;
- performing a speaker recognition;
- performing a semantic processing; and
- performing a keyword spotting.

6. Thee method according to claim 1, wherein at least one of the first user and the second user marks at least one segment of multimedia document of the respective user, provides at least one of a tag and an annotation to the at least one marked segment, and assigns at least one type of permission to the at least one of a tag and an annotation.

7. An apparatus for processing multimedia documents corresponding to parts of a conversation between two or more users, comprising a processor and a non-transitory computer-readable medium having processor-executable instructions stored thereon, the processor-executable instructions, when executed by the processor, causing the following steps to be performed:
- individually and locally generating or recording two or more multimedia documents by the two or more users, a first multimedia document of the two or more multimedia documents corresponding to a first part of the conversation corresponding to a first user, and a second multimedia document of the two or more multimedia documents corresponding to a second user;
- combining the two or more multimedia documents to a new combined multimedia document;
- defining at least two segments of the new combined multimedia document;
- assigning, based on input from the first user, a first type of permission to a first segment of the new combined multimedia document, wherein the first segment of the new combined multimedia document is based on content from the first part of the conversation corresponding to the first user; and
- assigning, based on input from the second user, a second type of permission to a second segment of the new combined multimedia document, wherein the second segment of the new combined multimedia document is based on content from the second part of the conversation corresponding to the second user;
- wherein the two or more multimedia documents each comprise time information and the step of combining the two or more multimedia documents is based on time;
- determining whether to assign a first binary permission to allow processing of at least one segment of the new combined multimedia document; and
- determining whether to assign a second binary permission to allow processing of at least one of a tag and an annotation; then
- assigning a plurality of types of permissions to at least one of the segment and the at least one of a tag and an annotation.

8. The apparatus according to claim 7, wherein the steps performed further comprise:
- marking at least one segment of the new combined multimedia document;
- providing at least one of a tag and an annotation to the at least one marked segment;
- assigning at least one type of permission to the at least one of a tag and an annotation provided to the at least one marked segment.

9. The apparatus according m claim 7, wherein the steps performed further comprise:
- processing an audio document; and
- performing at least one of: an emotion recognition, an age recognition, a gender recognition, a speaker recognition, a semantic processing and a keyword spotting.

10. The apparatus according to claim 7, wherein the steps performed further comprise:
- processing at least one of an image and a video document; and
- performing at least one of: a face detection, a face recognition, an emotion recognition, an age recognition, a gender recognition, a speaker recognition, a semantic processing and a keyword spotting.

* * * * *